(12) United States Patent
Salour et al.

(10) Patent No.: US 7,780,070 B2
(45) Date of Patent: Aug. 24, 2010

(54) METHOD OF MANUFACTURING A PRODUCT USING SCAN TARGETS

(75) Inventors: Ali Salour, Fenton, MO (US); Robert M. Barclay, Jr., Foristell, MO (US); Larry J. Laiben, Desoto, MO (US); Walter Raymond Baron, Swansea, IL (US)

(73) Assignee: The Boeing Company, Chicago, IL (US)

( * ) Notice: Subject to any disclaimer, the term of this patent is extended or adjusted under 35 U.S.C. 154(b) by 899 days.

(21) Appl. No.: 11/103,152

(22) Filed: Apr. 11, 2005

(65) Prior Publication Data

US 2010/0010660 A1 Jan. 14, 2010

(51) Int. Cl.
| | |
|---|---|
| G06F 17/00 | (2006.01) |
| G06F 7/00 | (2006.01) |
| G06F 19/00 | (2006.01) |
| G07B 15/02 | (2006.01) |
| G06K 7/10 | (2006.01) |
| G06K 19/00 | (2006.01) |
| B23Q 17/00 | (2006.01) |
| G01M 19/00 | (2006.01) |

(52) U.S. Cl. ............... 235/375; 235/376; 235/384; 235/487; 235/462.01; 700/115; 29/407.1

(58) Field of Classification Search ............ 235/375, 235/376, 384, 462.01, 487; 700/116, 115; 29/428, 430, 407.1, 407.9, 407.01; 118/697; 340/572.1

See application file for complete search history.

(56) References Cited

U.S. PATENT DOCUMENTS

| | | | | |
|---|---|---|---|---|
| 4,097,157 A | * | 6/1978 | Lill | 356/139.09 |
| 4,332,012 A | * | 5/1982 | Sekine et al. | 700/116 |
| 4,611,380 A | * | 9/1986 | Abe et al. | 29/430 |
| 4,848,137 A | * | 7/1989 | Turner et al. | 73/1.81 |
| 5,155,343 A | * | 10/1992 | Chandler et al. | 235/462.09 |
| 5,422,470 A | * | 6/1995 | Kubo | 235/462.09 |
| 5,602,379 A | * | 2/1997 | Uchimura et al. | 235/462.11 |
| 5,706,408 A | * | 1/1998 | Pryor | 700/259 |
| 6,230,382 B1 | * | 5/2001 | Cunningham et al. | 29/407.1 |
| 6,317,954 B1 | * | 11/2001 | Cunningham et al. | 29/407.09 |
| 6,516,239 B1 | * | 2/2003 | Madden et al. | 700/115 |
| 6,675,066 B2 | * | 1/2004 | Moshgbar | 700/229 |
| 6,725,116 B2 | * | 4/2004 | Sanada et al. | 700/115 |
| 6,772,027 B2 | * | 8/2004 | Kurihara | 700/99 |
| 6,801,821 B2 | * | 10/2004 | Madden et al. | 700/101 |
| 6,859,677 B2 | * | 2/2005 | Mitterholzer | 700/110 |
| 7,575,112 B2 | * | 8/2009 | Lowes et al. | 198/358 |
| 7,629,887 B2 | * | 12/2009 | Salour et al. | 340/572.1 |
| 2001/0015864 A1 | * | 8/2001 | Sanada et al. | 360/31 |
| 2002/0023361 A1 | * | 2/2002 | Jackson et al. | 33/293 |
| 2002/0104716 A1 | * | 8/2002 | Zaharia | 187/394 |
| 2003/0051356 A1 | * | 3/2003 | Jackson et al. | 33/293 |
| 2008/0103622 A1 | * | 5/2008 | Hanses et al. | 700/116 |
| 2010/0006337 A1 | * | 1/2010 | Kosoric | 175/24 |
| 2010/0033734 A1 | * | 2/2010 | Koop et al. | 356/622 |
| 2010/0097183 A1 | * | 4/2010 | Pollema et al. | 340/10.1 |

* cited by examiner

Primary Examiner—Daniel Walsh

(57) ABSTRACT

A method of manufacturing aircraft includes removably securing a target to a portion of the aircraft in a predetermined position on the portion of the aircraft. The method further includes scanning the target with a scanning device to acquire information about at least one of a location and orientation of the target. The method also includes processing the acquired information to determine at least one of a location and orientation of the portion of the aircraft. In addition, the method includes working the aircraft using the processed information and removing the target from the portion of the aircraft before completing manufacture of the aircraft.

20 Claims, 9 Drawing Sheets

METHOD OF MANUFACTURING A PRODUCT USING SCAN TARGETS

BACKGROUND OF THE INVENTION

The present invention relates to a method of manufacturing a product using scan targets and, more particularly, to a method of manufacturing aircraft using removably secured scan targets.

The accuracy with which automated manufacturing equipment is able to work parts depends largely on the quality of the location and orientation information used with the equipment. For example, with poor location and/or orientation information about a part, the most state of the art manufacturing equipment will only be able to work the part in a marginal manner. Conversely, with precise location and orientation information, a marginal piece of equipment may be able to perform well.

Automated manufacturing processes requiring a moderate amount of accuracy do not call for particular part location and orientation information beyond knowing the part has been positioned in a standard place. For these processes, the accuracy of standard part positioning allows part working with sufficient accuracy. In these processes, for example, a part to be worked can be placed in a standard location in or near the applicable automated machine, for example by abutting a predetermined edge of the part with a predetermined edge of a work platform and the machine can be programmed to work the part in that standard location. In processes requiring only moderate accuracy, standard part placement and machine operation are precise enough to achieve desired results.

Automated manufacturing processes requiring a high level of accuracy call for part locating and/or orienting after the part has been positioned. Common part locating and/or orienting methods involve scanning the parts to be worked after standard positioning using a vision system scanning device such as a camera or laser vision system scanning device. In these methods, the scanning device acquires location and/or orientation information about the part by visually sensing predetermined part features. For example, the scanning device can be programmed to locate a particular outside edge and interior hole of the part. The machine then processes the information procured from scanning to locate and/or orient the part in a coordinate system. Next, the machine works the part based on the processed location and/or orientation information.

Some processes require automated machinery to work parts with a very high degree of accuracy. For example, very high accuracy is required where interchangeable hole patterns are being used. Interchangeable hole patterns are those made in product parts likely to be interchanged during the life of the product. For example, while most other parts of aircraft may not require changing, it may be determined that a particular door typically requires replacement at least once during the life of the aircraft. In this example, the mating characteristics of the door and the door mounting location of the plane must lie within tighter than standard tolerances. Although parts of aircraft are generally manufactured at or about the same time and often in the same plant, an aircraft and a replacement part therefor may be manufactured at different plants and far apart in time. For example, an aircraft manufacturer may outsource replacement part manufacture to a supplier. Although various errors in a process repeatedly performed in the same place and time may cancel each other out or aggregate within acceptable limits, a part made decades later at a different location is less likely to have these benefits. For example, errors in formation of a first part are more likely to have errors that correspond to complimentary errors made in a second part on the same machine on the same day. Although standard tolerance ranges may be from about three hundredths of an inch to about six hundredths of an inch, applications such as interchangeable hole patterns can require tolerances of about one hundredths of an inch or less. Some applications would benefit from tolerances as low as about three thousandths of an inch or less.

Most conventional part locating and orienting processes, rely on standard part placement and/or scanning part features. These processes are unable to work parts to a repeatable degree of accuracy better than about three hundredths of an inch. Because parts usually have some amount of dimensional error, it is important for a part locating and/or orienting process to accurately recognize such errors. Sources of part error vary depending on the type of part and part features involved. One source of error is unintended dimensional variation. Dimensional variation occurs when at least one relevant part feature is malformed. As an example, FIG. 1 shows a part 10 of an aircraft wing including a first edge 12 having hinge apertures 14 cut in it. The location of corners 16, 18 can be determined through scanning the profile of the wing 10 and entered into a data processor (not shown). In many systems, the location of the edge 12 is determined by interpolation based on the location of the corners 16, 18. However, according to the location of the corners 16, 18, the edge 12 is expected to lie on a straight line 20 connecting the corners. In some systems, the location of the edge 12 is determined by interpolating and perhaps extrapolating from information acquired about the location of a few predetermined points (not shown) on the edge. Depending on the location of the particular points and the location of any edge 12 malformation, the method of interpolating and extrapolating from identified points on the edge may also result in a misunderstanding of where the edge is actually located. Thus, when automated machinery makes holes 22 at a predetermined distance 24 from the edge 12 based on its expected location, the holes near the error end up being too close to the actual edge. Insufficient edge distances can lead to tear problems whereby a part can rip next to the inadequate edge distance during use. Conversely, if edge 12 included an error that caused the side to follow a wide line 26, the distance between the holes 22 and the edge near the error would be too large. Insufficient and oversized edge distances may cause part fit problems. In both situations (i.e., insufficient and oversized edge distances), process accuracy would not be improved by scanning a part feature 28 protruding from the edge 12 halfway between the corners 16, 18. That is because the feature 28 lies along the specification line 20 for the edge 12 and further leads the data processor to calculate the edge 12 is straight. Further, visual characteristics of product feature 28 may render it difficult to accurately and reliably determine its location and orientation by scanning. For example, its shape, size, and color qualities may be insufficient to be reliably scanned. As insufficient or oversized edge distance may cause part weakness and fit problems, post-scanning part working errors due to inaccurate product location and orientation information can lead to these and other manufacturing and operational problems.

Dimensional error can also result from paint or other coatings applied to a thickness outside of a specified thickness range. Another common source of dimensional error results from separation distances between mating parts being outside of specified limits. Error due to dimensional variations is compounded when a part comprises multiple components and/or connections such that the errors aggregate. Some manufactures attempt to increase accuracy by manually creating each hole or other working requiring highly accurate placement. For example, one method of manual part working uses a "blanket" template having precise openings therein corresponding to locations for work to be done on the product. In use, a worker lays the template over the part and drills holes, or otherwise works, through the openings in the template. Manually working parts is time consuming and labor intensive and, thus, costly. Further, manual part working often does not result in the desired precision. Another conventional strategy for increasing accuracy of part working is to implement more precise scanning and working machinery. However, more precise machinery is very costly and can still produce insufficient accuracy.

BRIEF SUMMARY OF THE INVENTION

The present invention relates to a method of manufacturing aircraft comprising removably securing a target to a portion of the aircraft in a predetermined position on the portion of the aircraft. The method further includes scanning the target with a scanning device to acquire information about at least one of a location and orientation of the target. The method also includes processing the acquired information to determine at least one of a location and orientation of the portion of the aircraft. In addition, the method includes working the aircraft using the processed information and removing the target from the portion of the aircraft before completing manufacture of the aircraft.

In another aspect, the present invention includes a method of manufacturing a product comprising removably securing a target to a portion of the product in a predetermined position on the portion of the product. The method further includes scanning the target with a scanning device to acquire information about at least one of a location and orientation of the target. The method also includes processing the acquired information and automatically working the product using the processed information. In addition, the method includes removing the target from the portion of the product before completing manufacture of the product.

In yet another aspect, the present invention includes a method of manufacturing a product having a frame and a shell comprising removably securing a target to the product in a predetermined position on the product. The method further includes scanning the target with a scanning device to acquire information about at least one of a location and orientation of the target. The method also includes processing the acquired information to determine at least one of a location and orientation of the portion of the product and working the product using the processed information.

In still another aspect, the present invention includes a method of manufacturing a product comprising removably securing the product to a product mounting tool in a first predetermined position on the product mounting tool and removably securing a target to the product mounting tool in a second predetermined position on the product mounting tool. The method also includes scanning the target with a scanning device to acquire information about at least one of a location and orientation of the mounting tool and processing the acquired information. In addition, the method includes working the product using the processed information.

Other aspects of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE INVENTION

The present invention relates to a method of manufacturing a product using scan targets and, more particularly, to a method of manufacturing aircraft using removably secured scan targets. Reference will now be made in detail to an implementation in accordance with methods, systems, and articles of manufacture consistent with the present invention as illustrated in the accompanying drawings.

Figure 2:
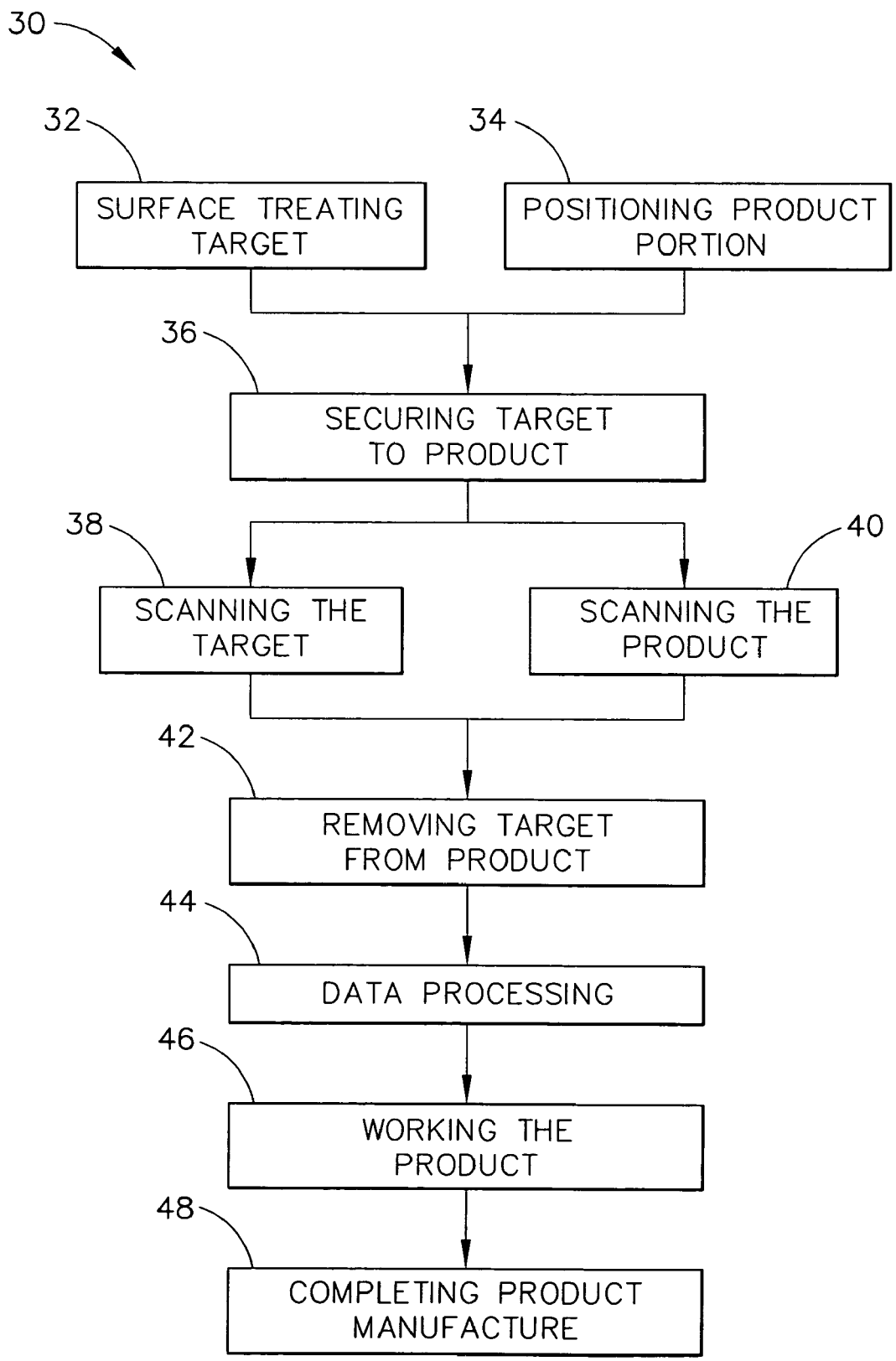
FIG. 2 is a process flow diagram of a method according to the present invention.

Methods, systems, and articles of manufacture consistent with the present invention allow precise automated manufacture of aircraft. Although use of the methods, systems, and articles of manufacture consistent with the present invention are primarily discussed with reference to aircraft, they may be applied to improve manufacturing accuracy of other products without departing from the scope of the present invention. Referring now to the figures, and more particularly to FIG. 2, a process according to a first embodiment of the present invention is designated in its entirety by reference number 30. One or more machines, collectively referred to as machinery (not shown), are used to implement the methods of the present invention. In one embodiment, the machinery includes a mounting apparatus, part placement equipment, a scanning device, a data processor, and working equipment. Machinery may also include equipment with which to fabricate the scan targets and equipment with which to secure the targets to and remove the targets from parts. All or some of this machinery may be automated. That is, each machine can have the ability to perform its function automatically, without manual assistance after being started.

The process 30 includes a step 32 of treating a surface of a scan tool or target (not shown in FIGS. 1 and 2) so features of the target, such as edges and voids, can be easily sensed by the scanning device (not shown). For example, the target may be painted white or yellow to contrast with a darker background. Alternately, the target can be fabricated of a material that can be easily sensed by the scanning device. For example, the target may be made of a silver aluminum to contrast with a darker background. In some embodiments, the appearance of the target surface contrasts with the appearance of the product to improve the ability of the scanning device to accurately sense target features when the target is superimposed over the product. The process 30 includes a step 34 of positioning a portion of the aircraft product on the mounting apparatus in a workstation to be scanned. The process 30 then includes a step 36 of removably securing the scan target to the aircraft portion in a predetermined position to the aircraft portion. Along with or instead of securing a scan target to the product, a scan target may be removably secured in a predetermined position to a product mounting tool or jig (shown in FIG. 9) on which the product is temporarily mounted during the manufacturing process.

The target is sized and shaped to correspond with a predetermined mounting position on the aircraft. Thus, targets can be made in infinite sizes and shapes, depending on the application, without departing from the scope of the present invention. For example, regarding shape, a target having cylindrical or conical features may be used to join corresponding cylindrical or conical features of the product on which the target is secured. Regarding size, targets used in manufacture of aircraft can range, for example, between about ¼ inch or less and about several feet or more. The target can be removably secured in the predetermined portion of the aircraft in a variety of ways. For example, the target can be fastened or pinned in place, secured by magnetism, or snug fit by expanding the target or product portion after being placed in a position. Alternately, the target may be non-removably secured to the product. In other words, the target can be secured to the product (e.g., adhesively bonded, riveted, or welded) and not removed prior to completion of manufacture. Thus, the target becomes a part of the product, albeit perhaps not serving any function after being used in the scanning step 38 of manufacture.

After the securing step 36, the method of the present invention includes a step 38 of scanning the target with a scanning device (not shown) to acquire information about the location and/or orientation of the target. Although the scanning device may be other types without departing from the scope of the present invention, in one embodiment, the scanning device is a conventional laser vision scanning device such as a Vision End Effector of the Flexible Assembly System available from PaR Systems Inc. of Shoreview, Minn. In another embodiment, the scanning device is a conventional camera vision scanning device. The target scanning step 38 involves identifying at least one particular and predetermined feature of the target. In one embodiment, the target feature includes a void in the target. For example, the scanning device can be programmed to identify a central hole through the target. In another embodiment, the target feature includes a particular edge of the target. For example, when secured in the predetermined position on the aircraft portion, the target may have a single visible face, which has a top edge and the scanning device can be programmed to identify the position of the top edge. The method may also include a step 40 of scanning the aircraft portion to acquire information about the general position of the portion.

After the scanning step 38, the scan target may be removed 42 from the predetermined mounting position on the portion of the aircraft. As with the other steps 32, 34, 36, 38 40, the target removing step 42 can be performed automatically or manually without departing from the scope of the present invention. For example, the target can be removed from the subject aircraft portion by a robot or by hand.

Information from the scanning steps 38, 40 is processed by a data processor (not shown) in a data processing step 44 to determine a precise location and/or orientation of the aircraft portion. Although the data processor may be other types without departing from the scope of the present invention, in one embodiment the data processor is a conventional personal computer having a vision processor board with image processing software loaded thereon, the board and software being available from Matrox Electronics Systems Ltd. of Dorval, Quebec, Canada. In one embodiment the data processor stores the location and orientation of the aircraft portion by assigning two-dimensional coordinates (i.e., having X and Y components) to target and aircraft portion features based on the information acquired from scanning. Alternatively, the aircraft portion and target may be located in a three-dimensional coordinate system (i.e., having X, Y, and Z components). The coordinate data is processed with the specification dimensions, locations, and orientations of the target and aircraft portion to determine the precise location and orientation of the subject aircraft portion, as well as information about the contour of the portion. In one embodiment, the specification dimensions of the scan target are input into the data processor by scanning the target, or a sample target of the same dimensions, before the target is secured to the product. In embodiments in which multiple target features are scanned, location and orientation information of those features can be combined to identify particular target lines or points (not shown) on the target or product. For example, when two or more voids in a target are aligned perpendicular to a target edge, the data processor can be programmed to identify where the line through the centers of the voids intersects the edge. As another example, where each of multiple voids in the target lies along one of two intersecting lines, the data processor can be programmed to identify the point at which the lines intersect. The point of intersection of the identified lines can be a point on the target or a point on the product, such as a point at which a hole is to be drilled into the product.

The location and orientation of the scan target help determine the location and orientation of the aircraft portion by indicating the location of the portion to which the target is attached. Thus, by determining the precise location and orientation of the target mounting position of the aircraft portion by scanning the target secured thereto and knowing where that mounting position is supposed to be with respect to the rest of the aircraft portion, the precise location and orientation of the portion can be determined. During the target securing and scanning steps 36, 38, more than one scan target can be secured and scanned. As will be appreciated by those skilled in the art, scanning more targets and product features generally results in increased accuracy of information regarding product location and orientation.

After the scanning steps 38, 40 and data processing step 44, a step 46 of working the aircraft using the processed information is performed. The working step 46 may include multiple sub-steps. For example, in one embodiment the working step 46 includes a first sub-step of drilling one or more holes, a second sub-step of placing a male fastener component in the holes, and a third sub-step of fastening a corresponding female fastener component to the male component. Example fastener components include rivets, nuts, screws, nails, bolts, washers, anchors, inserts, studs, and pins. In another embodiment, the working step includes routing out a portion of the subject aircraft part using the processed information. The working step may include any conventional manufacturing step.

After the target is removed and the aircraft portion is worked at the workstation, if desired, the process can include a step 48 of completing manufacture of the product at the same workstation and/or other workstations. If the scan target is removed before manufacture is complete, the manufacture completing step 48 can include a step of attaching a component of the product in the same predetermined position the target was secured in and removed from.

Although shown and discussed in a particular order, those skilled in the art will appreciate the pre-completion steps 32, 34, 36, 38, 40, 42, 44, 46 of the process 30 can be performed in various orders. For example, in one embodiment, the target securing step 36 occurs prior to the product positioning step 34. In another embodiment, the target removing step 42 occurs after the data processing and product working steps 44, 46. Also, the process of the present invention may be performed without one or more of the surface treating, product scanning, and target removing steps 32, 40, 46.

Figure 3:
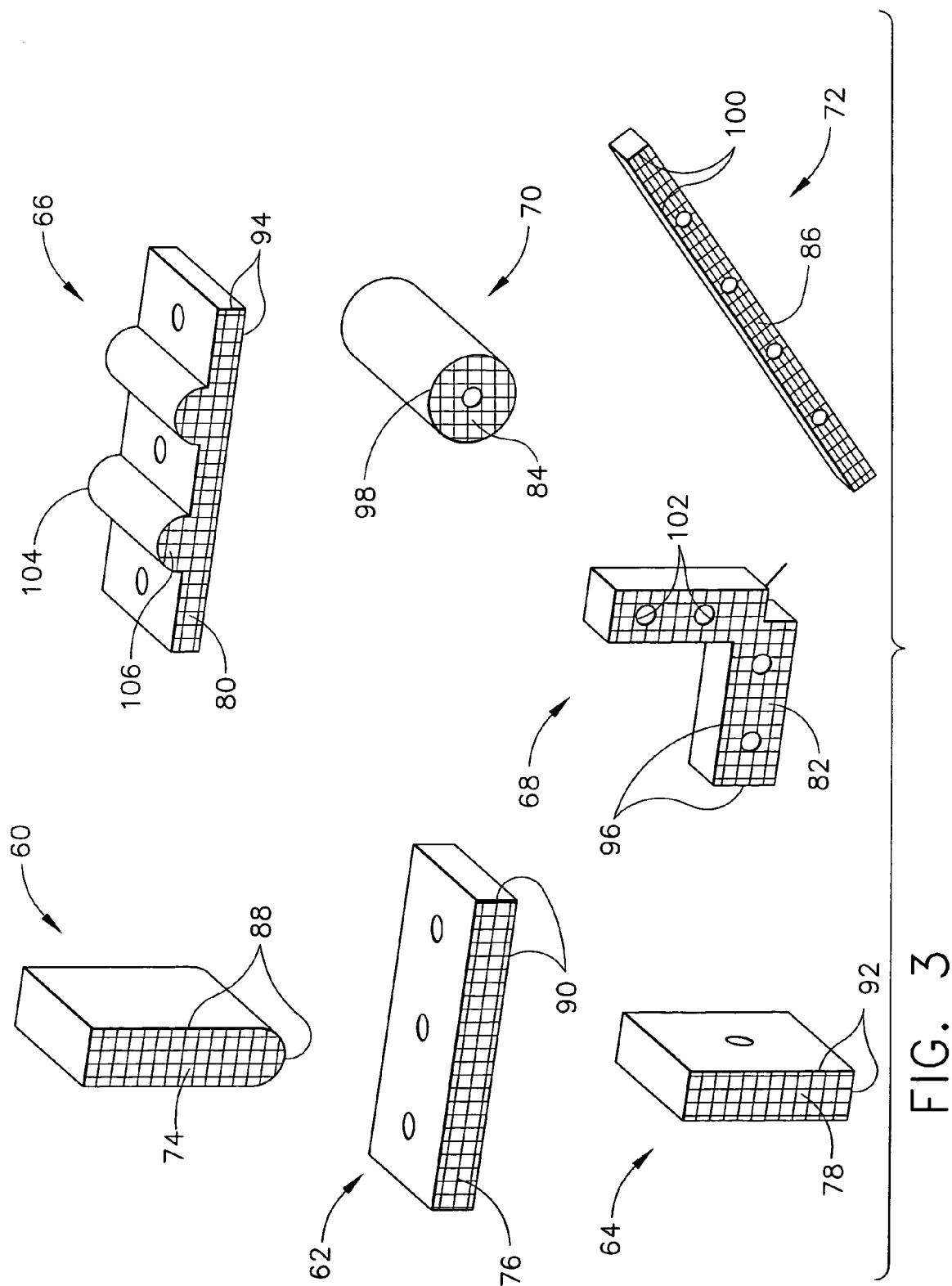
FIG. 3 is a perspective of numerous exemplary scan targets according to the present invention.

FIG. 3 shows examples scan targets 60, 62, 64, 66, 68, 70, 72. Because scan targets are shaped to correspond to particular applications, there are an infinite number of potential target shapes and those shown are merely illustrative embodiments. To accommodate products having symmetrical sides, separate targets can be made for each side (i.e., left-hand side and right-hand side) or a single target can be shaped to mate with the predetermined mounting positions on both sides. Although the scan targets 60, 62, 64, 66, 68, 70, 72 may be made of other materials without departing from the present invention, in one embodiment the scan targets are made of aluminum.

Figure 5:
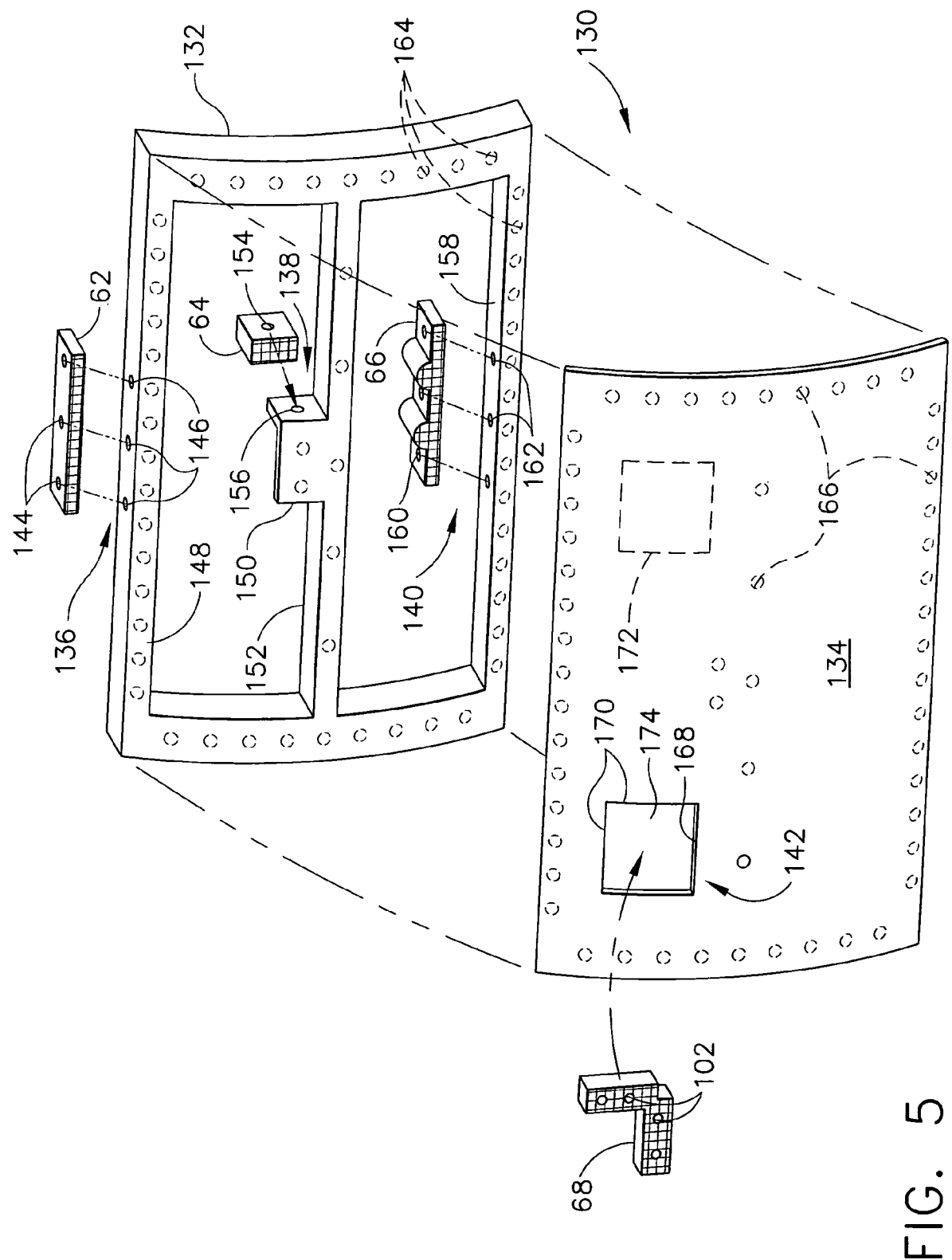
FIG. 5 is a perspective of a second exemplary scan target used with a portion of a product according to the present invention.

Many considerations go into the formation of scan targets. One consideration is ergonomics. That is, the targets 60, 62, 64, 66, 68, 70, 72 are formed for easy handling, by human operators and/or machines. Another consideration in target formation is their scanability or the effectiveness with which they can be scanned. Namely, at least one surface 74, 76, 78, 80, 82, 84, 86 of each target 60, 62, 64, 66, 68, 70, 72 should be highly visible. As discussed above, either the at least one highly visible surface 74, 76, 78, 80, 82, 84, 86 of each target 60, 62, 64, 66, 68, 70, 72 can be coated with a light color, such as white or yellow, or the target can be made of a light colored material to improve target scanability with respect to darker backgrounds and/or products. In one embodiment, the highly visible surfaces 74, 76, 78, 80, 82, 84, 86 are coated with a material having properties particularly suited for being highly scanable. For example, the surfaces may be coated with a paint having a high reflectivity with respect to the type of scanning signals used. Further, each scan target 60, 62, 64, 66, 68, 70, 72 has edges 88, 90, 92, 94, 96, 98, 100 and the scanning device can be programmed to notice one or more of these edges. Also, some targets 68 have one or more holes 102, as shown in FIGS. 3 and 5. Scan target holes 102 are easily recognized due to the highly visible quality of the target surface 82 surrounding their front openings. Other features for allowing the scan device and data processor to better determine the position of the product include having arched projections 104 that create arched portions 106 on the front surface 80 of the target 66.

Another consideration in the formation of scan targets 60, 62, 64, 66, 68, 70, 72 is dimensional consistency. Target use is more reliable if, along with the targets being properly secured to the product during each use, the targets are precision machined and durable. Precision machining, as opposed to normal or standard machining, allows parts to have actual dimensions within a small amount of variation. For example, a precision machined scan target may vary from its specification dimensions between about one thousandths of an inch and about five thousandths of an inch. A primary way to increase target 60, 62, 64, 66, 68, 70, 72 durability is through making them of materials and in shapes that allow them to maintain their precision machined shape over time and through repeated use.

Figure 1:
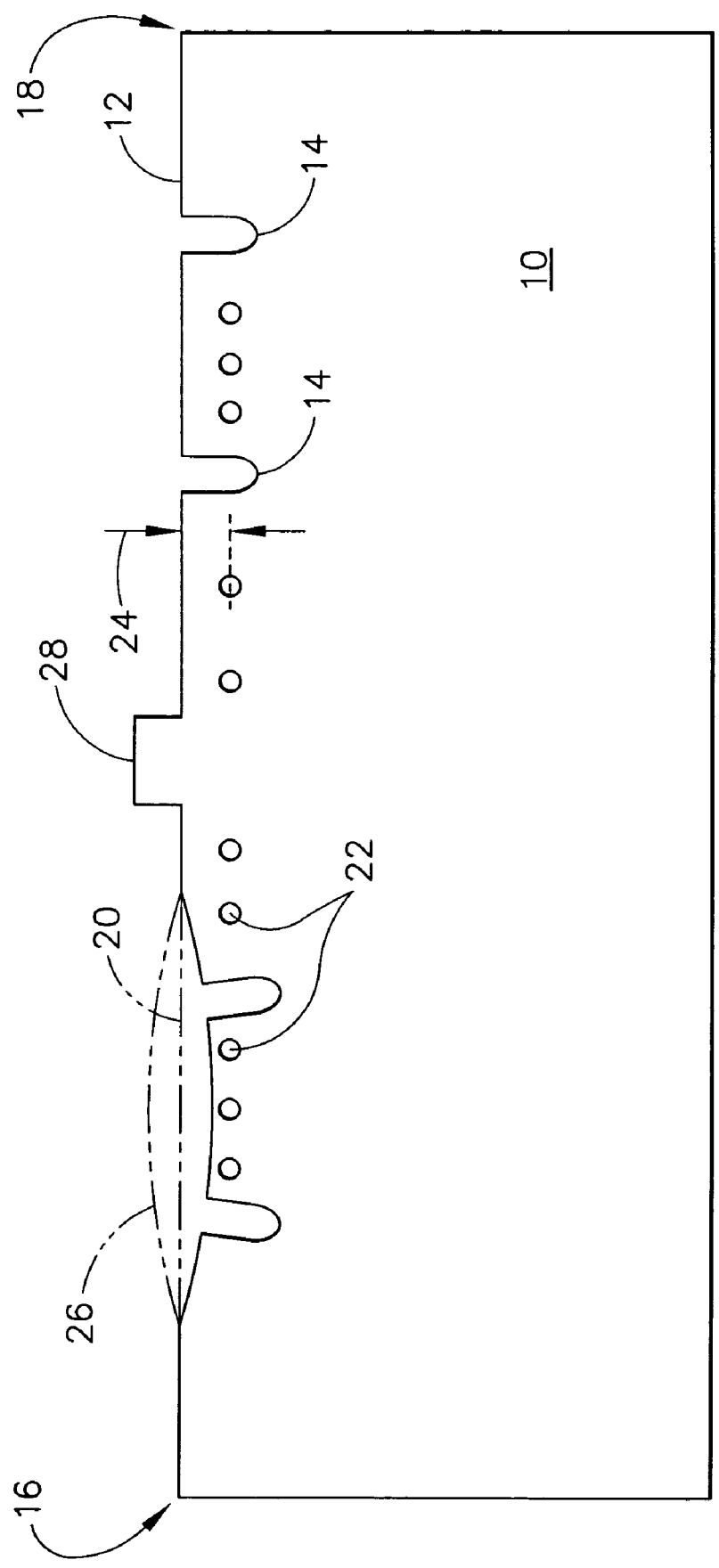
FIG. 1 is a plan view of a malformed part of an aircraft wing.
Figure 4:
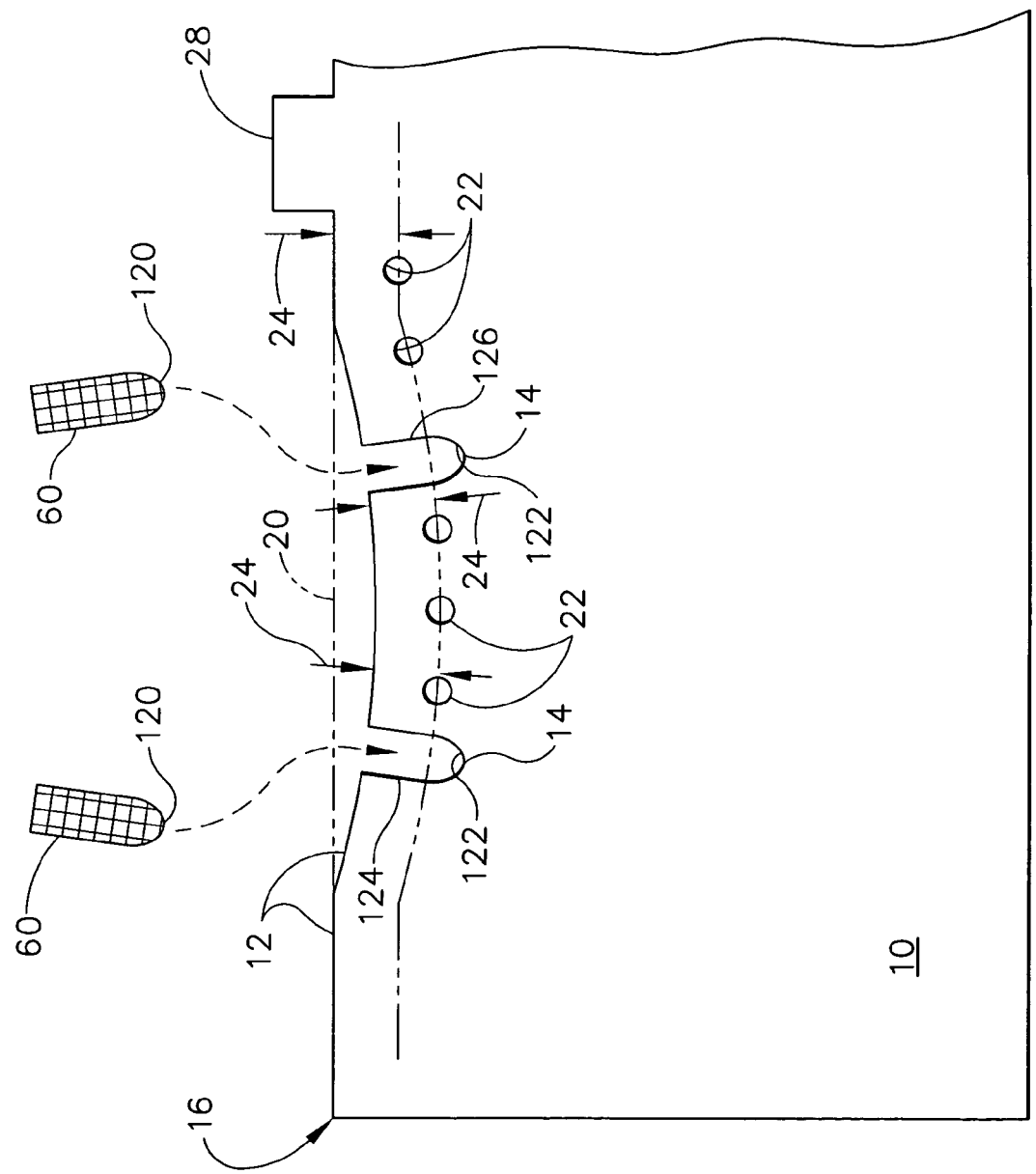
FIG. 4 is a top plan of a first exemplary scan target used with the malformed part shown in FIG. 1 according to the present invention.

FIG. 4 illustrates use of the hinge scan target 60 with the aircraft wing part 10 shown in FIG. 1. In this embodiment, the hinge scan target 60 has a curved portion 120 corresponding to a curved portion 122 of each hinge aperture 14 of the part 10. According to the method described and shown in FIG. 2, the scan target is secured to the part 10 in a target securing step 36. Next, the automated machinery scans the target 60 and part 10, if desired, in the scanning steps 38, 40. Based on the information from scanning, the data processor will realize the first edge 12 is shifted from its specification location 20. The processor will discern this part error whether the scan target 60 is secured in the first or second hinge aperture 124, 126 of the aircraft part 10 apertures 14. If a hinge scan target 60 is secured in the first and second hinge aperture 124, 126, the scanning device can ascertain more part location and orientation information, as well as contour information. From this increased information, the data processor can better understand the actual location and orientation of the part 10. For example, instead of considering that the first edge 12 may vary from its intended line 20 only near the first hinge aperture 124, as may be the case if only a hinge target 60 were used there, the data processor is able to surely determine the first edge 12 varies from straight 20 near the first and second hinge apertures 124, 126. The deformity can be further characterized by comparing the variation between the actual and intended location and/or orientation of the first hinge aperture to the variation between the actual and intended location and/or orientation of the second hinge aperture 126. Although considering more scan references often results in better location and orientation data, those skilled in the art will appreciate that more references will not always result in better part 10 location and orientation data as effective placement strategies and accurate actual placement of scan references are also highly determinative of scan results.

From knowing the actual location and orientation of the portion of the part 10, the automated machinery can create holes 22 having a specified edge distance 24 to the actual edge 12. If the actual edge 12 varies too greatly from the intended edge line, there may be problems in joining the part 10 to a mating product (not shown). Also, although a proper edge distance 24 is ensured by the present process, too great of an edge 12 deformation may negatively affect end product operation. By determining that a part 10 is malformed during scanning, parts outside of a specified tolerance can be corrected or discarded before they are worked and/or assembled to other parts.

FIG. 5 illustrates an embodiment of the present invention involving a portion of a product 130 having a frame 132 and a shell or skin 134. Upper frame scan target 62, central frame scan target 64, lower frame scan target 66, and skin scan target 68 are designed to mate with corresponding predetermined mounting positions 136, 138, 140, 142 of the product 130. The upper frame target 62 is secured atop the frame 132 by way of mounting holes 144, 146 in the target and frame. Scanning the upper frame target 62 provides information that the data processor can use, for example, to more accurately determine the location, orientation, and contours of the upper frame support 148 of the frame 132 with respect to its specification characteristics and the other product 130 portions. The central frame target 64 is secured to a flange 150 extending from a central frame support 152 of the frame 132 by way of mounting holes 154, 156 in the target and flange. Scanning the center frame target 64 provides information that the data processor can use, for example, to more accurately determine the location, orientation, and contours of the center frame support 152 and the flange 150 with respect to their specification characteristics and the other product 130 portions.

Lower frame target 66 is secured to a lower frame support 158 of the frame 132 by way of mounting holes 160, 162 in the target and lower frame support. Scanning the lower frame target 66 provides information that the data processor can use, for example, to more accurately determine the location, orientation, and contours of the lower frame support 158 with respect to its specification characteristics and the other product 130 portions.

In one embodiment, automated machinery works the product by forming holes at predetermined hole locations 164 of the frame 132 depending on location and orientation information ascertained through scanning targets 62, 64, 66 and, if desired, the frame 132. In another embodiment, the information gleaned from scanning is used to accurately attach the skin 134 to the frame 132. In various embodiments, the scan targets 62, 64, 66 are removed from the product 130 before the skin is attached, removed after the skin is attached, and left in place. In the case where the target will be removed, it can be removed before or after working of the product 130 without departing from the scope of the present invention. After the skin 134 has been accurately attached to the frame 132, the machinery can work the product by, for example, forming holes in predetermined skin hole locations 166. One method of forming holes at the skin hole locations 166 is by driving fasteners (not shown) through the skin 134. Holes for the frame and skin hole locations 164, 166 can be formed simultaneously after the skin 134 has been attached to the frame 132. Accurately determining the location and orientation of the frame 132 by scanning the targets 62, 64, 66 and, if desired, the frame 132, can be especially helpful for working the frame after the skin 134 has been attached and the frame is no longer visible from the working perspective. As will be appreciated by those skilled in the art, various disclosed embodiments may be used during the same manufacturing process.

In one embodiment of the present invention, a skin scan target 68 is used to determine the position of the product 130. The skin target 68 is designed to fit within a skin recess 168 of the skin 134. Scanning the skin target 68 after it is secured in the recess 168 in the scanning step 38 provides the data processor with product 130 location and orientation information, including specific information about the location and orientation of the recess. Scanning the skin target 68 is especially helpful in locating the recess 168 for it is very difficult to recognize slight changes in depth such as that occurring at edges 170 of the recess 168. A benefit of using scan tools in product positions spaced away from the edges is the data processor can acquire location and orientation information closer to points of working that are spaced away from the reliably scannable product features. Acquiring location and orientation information of the product closer to a place for working increases the accuracy with which the product can be worked at that place. Example types of working the skin 134 include forming an opening for a door or window at an opening location 172 of the skin and routing all or a portion of the material lying at the bottom 174 of the recess 168.

Figure 6:
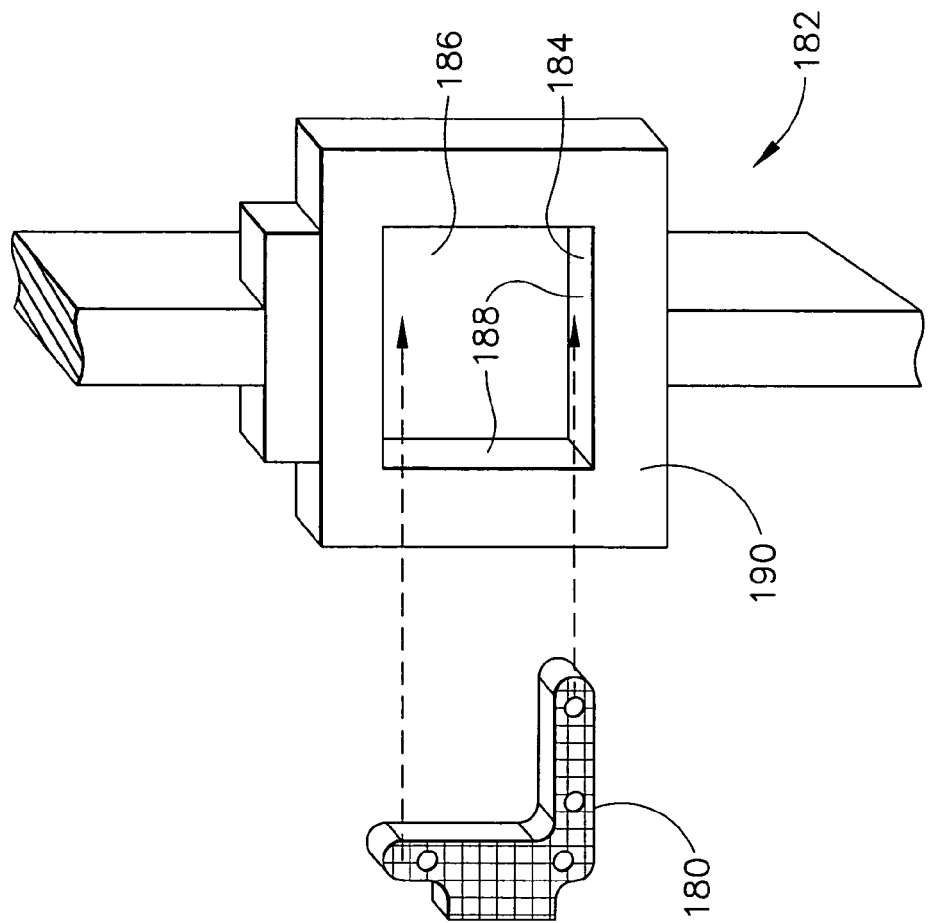
FIG. 6 is a perspective of a third exemplary scan target used with portions of a product according to the present invention.
Figure 6:
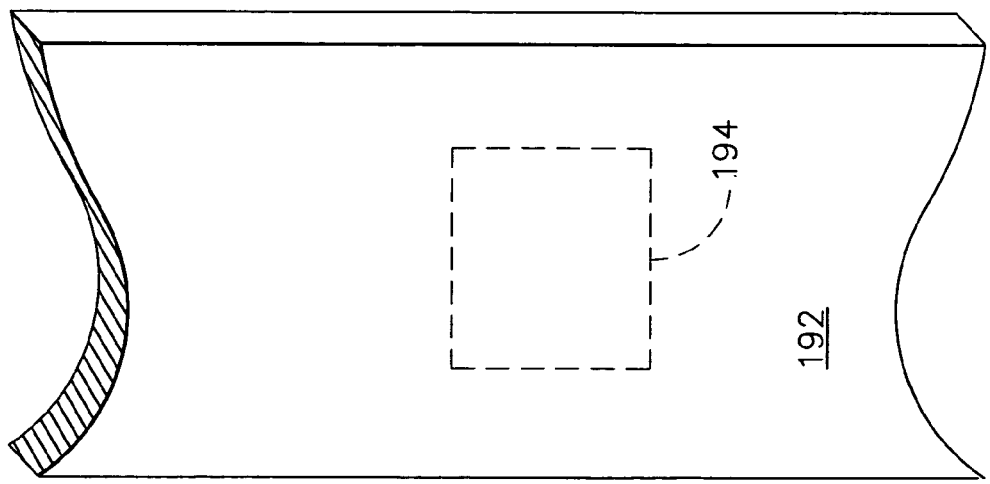

FIG. 6 shows an embodiment of the present invention illustrating benefits of scan target usage with especially sensitive products. The embodiment includes a substrate scan target 180 similarly shaped to the skin scan target 68. Substrate 182 can include a substrate recess 184 into which the target 180 is secured and vulnerable items, such as wiring (not shown), located along the bottom 186 of the recess 184, under the bottom of the recess, along the side walls 188 of the recess, and/or behind the side walls of the recess, under the front surface 190 of the substrate. After the scanning steps 38, 40, a skin or shell 192 is placed over the substrate 182 and recess 184 therein. Based on the processed scanning information, the automated machinery can cut or rout an opening 194 in the shell 192 corresponding with shape of the substrate recess 184. The opening 194 may be, for example, an opening used to create a panel through which an end user of the product incorporating the substrate 182 and shell 192 can access the recess 184 and sensitive items therein. Because slight variations in cutting or routing can cause serious damage to the vulnerable items, it is very important for the substrate location, orientation, and contour information to be as accurate as possible.

Figure 7:
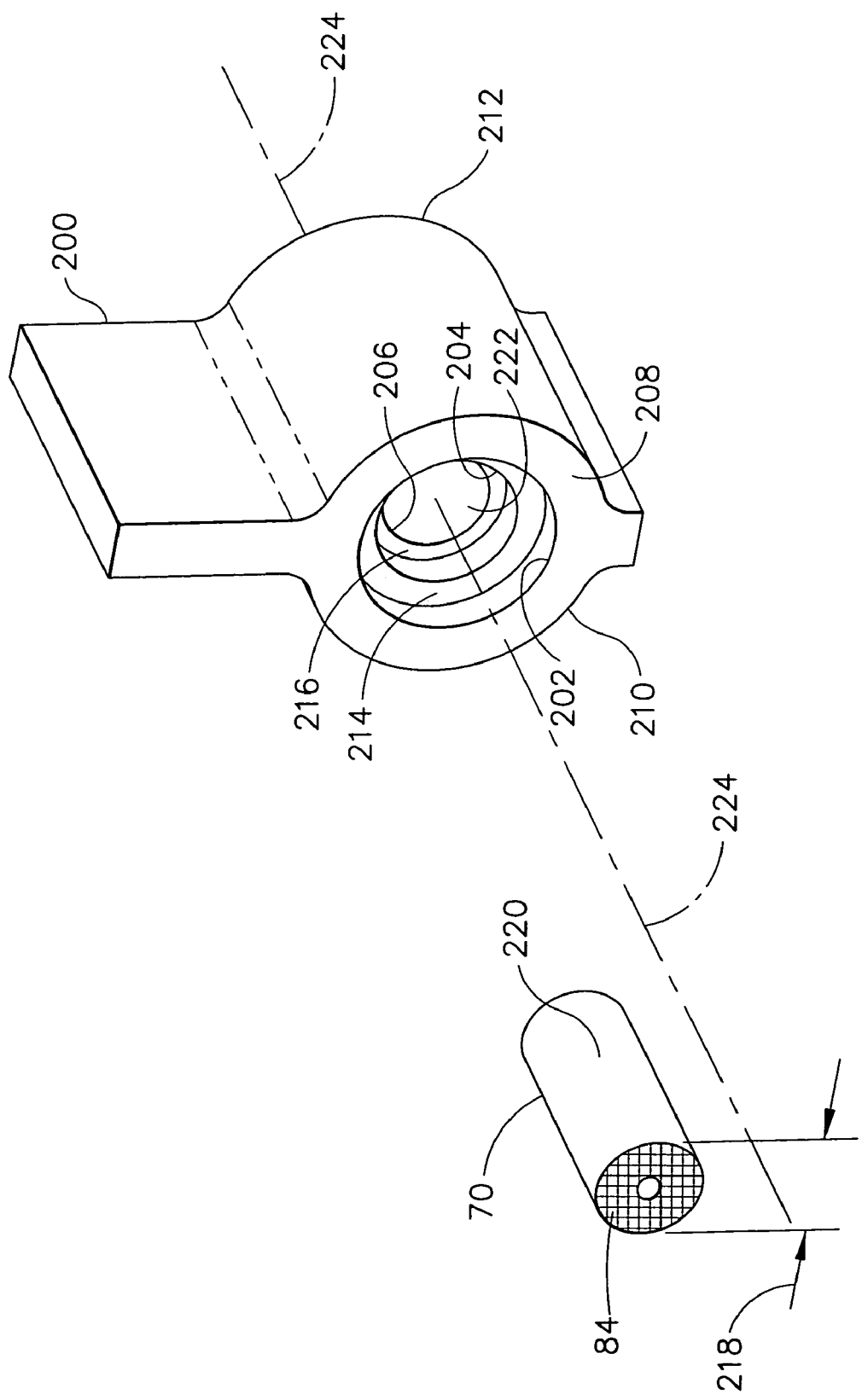
FIG. 7 is a perspective of a fourth exemplary scan target used with portions of a product according to the present invention.

FIG. 7 shows an embodiment of the present invention where cylindrical scan target 70 is secured to a product portion 200. The product portion 200 includes two or more concentric holes 202, 204, 206 in the face 208 of the product portion 200. Only the innermost hole 206 travels through the product portion 200 from a front end 210 to a second end 212. Thus, first and second circular steps 214, 216 are formed such that the inner diameter of the first step 214 is the same as the outer diameter of the second step 216. Scanning the product portion 200 alone would be insufficient for accurately locating the holes 202, 204, 206 and, more specifically, their common center. This is because the visual variations between the holes 202, 204, 206 cannot be reliably discerned by conventional scanning devices.

The cylindrical scan target 70 is placed within the innermost hole 206. The target 70 can be secured to the product portion 200 in a variety of ways without departing from the scope of the present invention. For example, in one embodiment, the shape of the target 70 is mechanically adjustable such that the diameter 218 of the target can be expanded when a screw (not shown) is screwed into the target. The diameter 218 of the target 70 is increased until the outer wall 220 of the target engages the inner wall 222 of the innermost hole to secure the target 70 in place. In another embodiment, the target 70 and the product portion 200 can change shape to secure the target in place.

Once the target 70 is secured in place, the scanning device can easily locate the target because of its highly visible front surface 84 and, thereby, locate the innermost hole 206 and a common center axis 224 of the holes 202, 204, 206. As with any scan target, the cylindrical target 70 can have throughholes (not shown) or other features that the scanning device can easily pick-up and the processor can use to more accurately determine position and contour of the product portion 200.

Figure 8:
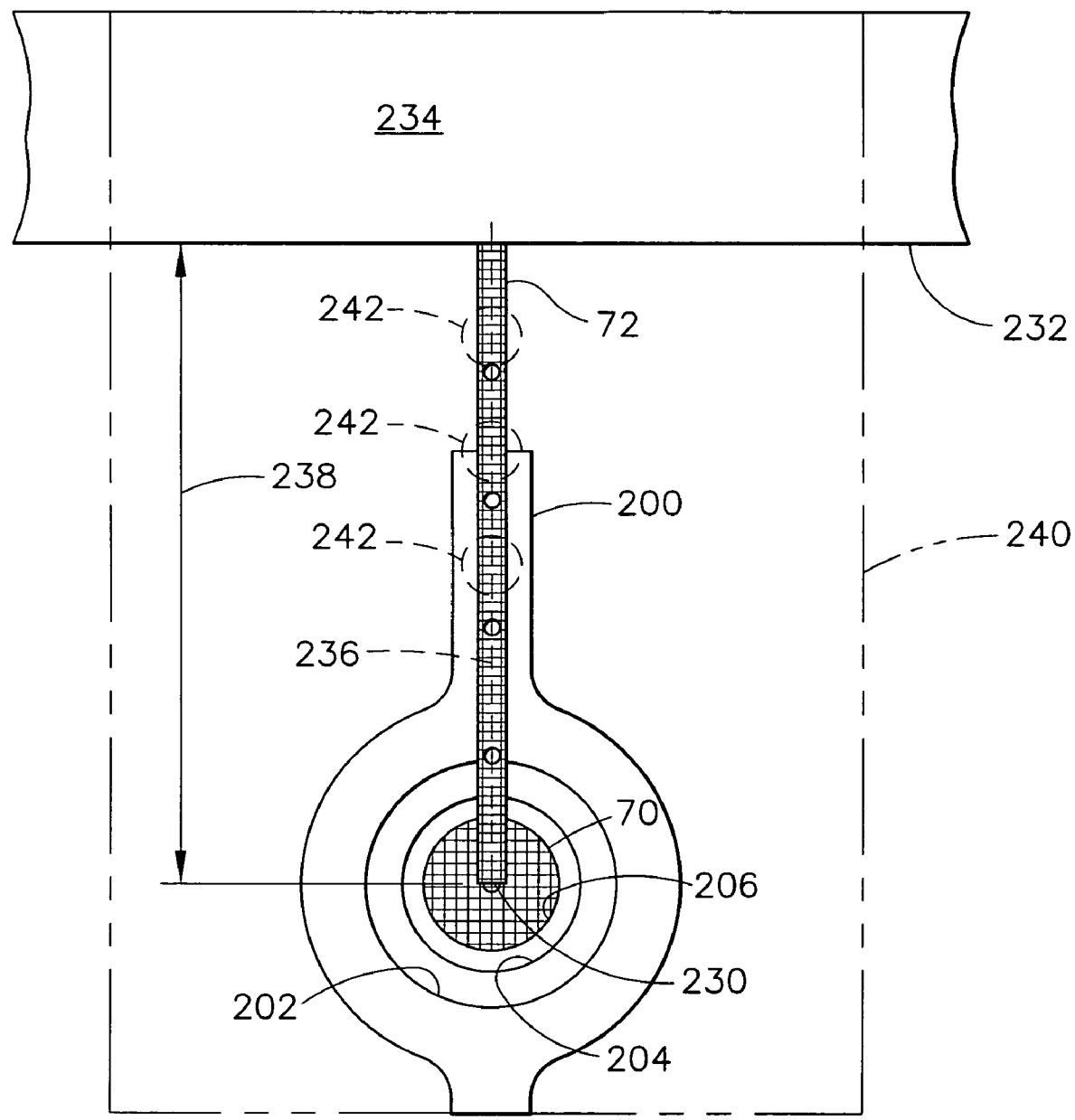
FIG. 8 is a top plan of a fifth exemplary scan target used with portions of a product according to the present invention.

FIG. 8 shows use of the elongated scan target 72 in combination with the cylindrical scan target 70 shown in FIG. 7. In this embodiment, the cylindrical target 70 is secured within the first product portion 200 and the linear target 72 extends from a center axis 230 of the cylindrical target 70 to contact a near surface 232 of a second product portion 234. The elongated target 72 can be aligned with the center 230 of the cylindrical target in various ways without departing from the scope of the present embodiment. For example, the two targets 70, 72 can have mating locating features, such as a pin and hole (not shown). Scanning the targets 70, 72 of this embodiment and, if desired, the product portions 200, 234 allows the data processor to more accurately locate the first product portion 200, the second product portion 234, and a straight line 236 through the center axis 230 of the holes 202, 204, 206 that is perpendicular to second portion surface 232. With the data procured by scanning the cylindrical and elongated targets 70, 72, the data processor, knowing the precision length 238 of the elongated target 72, can also determine the distance between the center axis of the holes, which corresponds to the cylindrical target center axis 230, and the surface 232. Knowing the position of the product portions 200, 234, the shortest connecting line 236 between the two, and the distance between the two portions can be helpful, among other ways, by allowing the machinery to more accurately work a skin or shell 240 laid over the two portions. For example, if a particular application requires that holes 242 be made in the shell 240 directly above the line 236, the data processor will be able to direct the machinery to accurately do so based on the position data obtained from scanning the two targets 70, 72 in place and, if desired, one or both of the product portions 200, 234.

Figure 9:
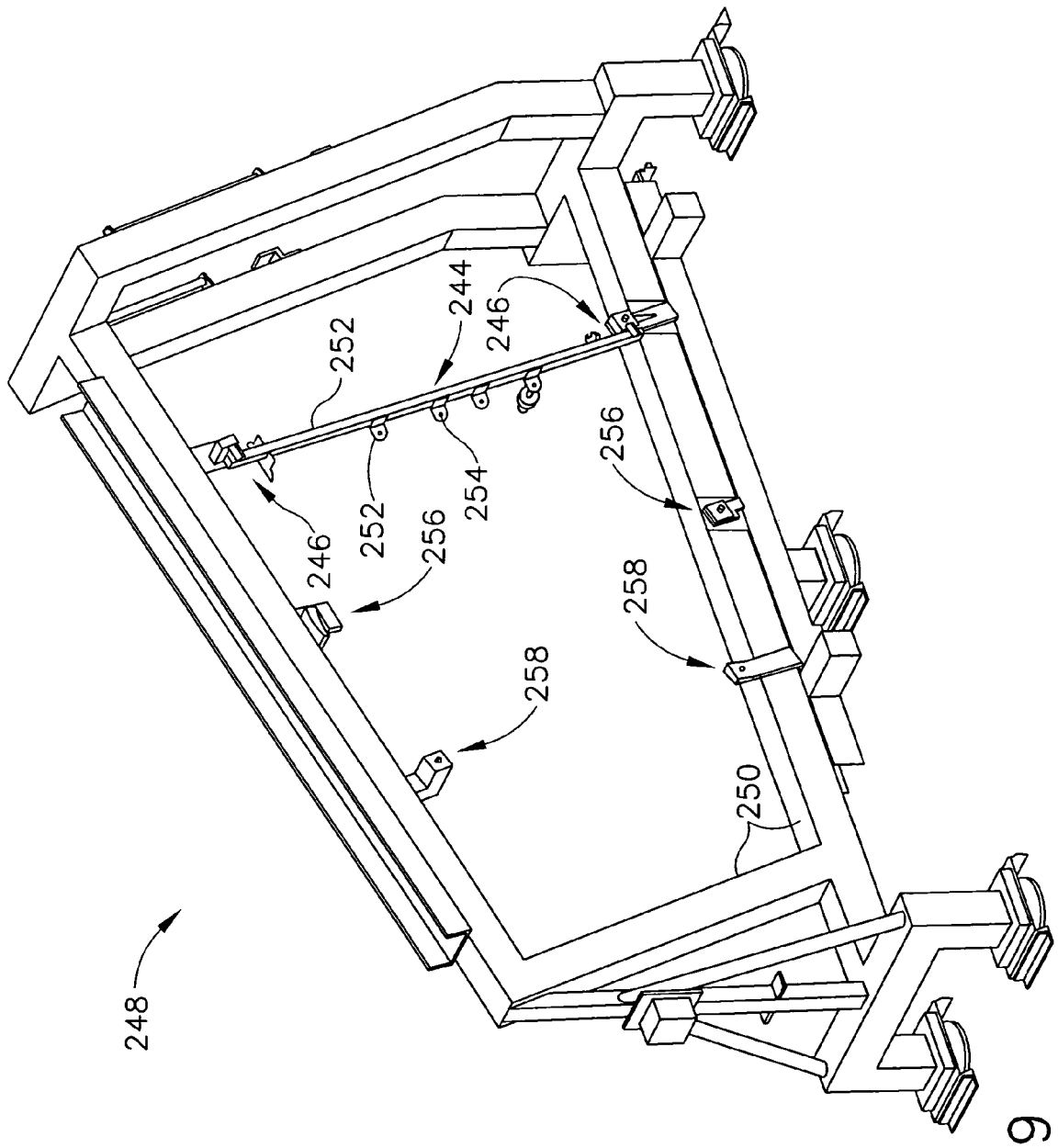
FIG. 9 is a perspective of a sixth exemplary scan target used with a product mounting tool according to the present invention.

FIG. 9 shows an embodiment of the present invention in which a scan target 244 is removably secured in a predetermined position 246 to a product mounting tool or jig 248 on which the product (not shown) is temporarily mounted during the manufacturing process. With respect to the jig 248 shown, the product can be mounted between the frame components 250 of the jig in a predetermined position. The target 244 is scanned to acquire accurate location and orientation information about the jig 248. The target 244 has multiple features that can be sensed during the scanning process, such as edges 252 and voids 254. Because the product is mounted on the jig in a precise manner, the location and orientation of the jig can be used to accurately work the product as desired. Scan targets 244 may also be mounted in other positions 256, 258 on the jig 248 for scanning.

Through use of scan targets as shown and described herein, the quality of product manufacturing can be greatly improved. Although conventional manufacturing techniques are unable to repeatably work parts within better than about three hundredths of an inch, the present technique enables conventional machinery (e.g., traditional scanning devices and working apparatus) to work parts within between about one hundredths of an inch and about three thousandths of an inch. Even a slight difference in accuracy can make a tremendous difference in product quality and the ability to replace product components in the future. The scanning and working method of the present invention allows automated machinery to repeatably operate with high accuracy through precise determination of part location, orientation, contour, and inter-portion positions when there are multiple part portions. Through improved accuracy, product manufacturing is greatly enhanced.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A method comprising:
   determining a precise location of a feature on a portion of an aircraft, including:
      securing a removable target to a precise mounting position with respect to the aircraft feature, the target providing target features that can be easily sensed by a scanning device;
      thereafter scanning the target and using the scanned target to determine the precise location of the aircraft feature instead of using a scan of the aircraft feature; and
   performing at least one manufacturing operation at the precise location.

2. A method as set forth in claim 1, wherein the target is secured to a frame of the aircraft; and the method further includes fastening aircraft skin to the frame at the precise location.

3. A method as set forth in claim 1, wherein coordinate data about the precise location is automatically supplied to machinery that automatically performs a manufacturing operation at the precise location.

4. A method as set forth in claim 3 wherein the manufacturing operation includes a fastening operation.

5. A method as set forth in claim 1, further comprising attaching a component to the portion after the target has been removed.

6. A method as set forth in claim 1, wherein the target features include a void in the target.

7. A method as set forth in claim 1, wherein the precise location of an edge is determined.

8. A method as set forth in claim 1, wherein the target features include a plurality of voids, each void lying on one of two intersecting lines, and wherein the precise location of a point at which the two lines intersect is determined.

9. A method as set forth in claim 1, wherein the target is scanned with the scanning device.

10. A method as set forth in claim 1, wherein the manufacturing operation includes forming a hole at the precise location.

11. A method as set forth in claim 10, wherein the manufacturing operation further includes filling the hole with a fastener.

12. A method comprising:
   determining precise locations of features of a product, including:
      securing targets having scannable features to the product at known positions relative to the corresponding features;
      scanning the targets with a scanning device; and
      processing scanned target information from the scanning device to determine the precise locations of the features of the product, wherein the scanned target information is used to determine the precise locations instead of scanning the features with the scanning device; and
   working the product using the determined locations.

13. A method of manufacturing a product as set forth in claim 12, wherein at least one target is threadably fastened to a shell.

14. A method of manufacturing a product as set forth in claim 12, wherein at least one target is secured to a frame.

15. A method of manufacturing a product as set forth in claim 14 further comprising removing the at least one target from the frame and placing a shell on the frame after the acquiring information and before working the product.

16. The method of claim 12, wherein the product is an aircraft frame; and wherein working the aircraft frame includes attaching skin to the aircraft frame and further working on the frame after the skin has been attached and the frame is no longer visible from a working perspective.

17. The method of claim 12, wherein working the product includes drilling holes in the product at the precise locations.

18. The method of claim 12, wherein the product is mounted to a jig, and wherein at least one target has a predetermined position with respect to the jig.

19. The method of claim 12, wherein at least one target is secured within its corresponding feature.

20. The method of claim 12, wherein at least one target is secured adjacent to its corresponding feature.

* * * * *